United States Patent

Hasegawa

[11] 4,449,702
[45] May 22, 1984

[54] FULL EXTENSION LOCKING DEVICE FOR DAMPER

[75] Inventor: Mitsuhiro Hasegawa, Gifu, Japan

[73] Assignee: Kayaba Kogyo Kabushiki Kaisha, Japan

[21] Appl. No.: 335,672

[22] Filed: Dec. 30, 1981

[51] Int. Cl.³ .............................................. F16F 9/32
[52] U.S. Cl. .................. 267/64.12; 188/300; 188/322.12; 267/120
[58] Field of Search ...................... 267/64.12, 120, 124; 188/300, 322.12, 321.11, 322.22, 67, 271; 296/56, 65 A, 76

[56] References Cited

U.S. PATENT DOCUMENTS

| 3,883,126 | 5/1975 | Nicholls | 267/64.12 |
| 3,938,793 | 2/1976 | Kaptanis et al. | 296/56 X |
| 4,078,779 | 3/1978 | Mölders | 267/120 |

FOREIGN PATENT DOCUMENTS

| 523902 | 8/1929 | Fed. Rep. of Germany | 188/300 |
| 1902019 | 8/1970 | Fed. Rep. of Germany | 188/322.12 |
| 1028667 | 5/1953 | France | 188/322.12 |
| 56-14636 | 2/1981 | Japan | |
| 833027 | 4/1960 | United Kingdom | 188/322.12 |

Primary Examiner—Douglas C. Butler
Attorney, Agent, or Firm—McGlew and Tuttle

[57] ABSTRACT

Full extension locking device which securely maintains the fully extended state of the stay damper, etc. for closing and opening of the back door of a car and which assures smooth contraction of the damper when an external force is added. An elastic cover along the cylinder is fixed to the piston rod and this cover is deformed and blocked by the stopper provided on the cylinder at the time of full extension of the damper, and the locking is released at the time of contraction. It is possible to see whether the lock is working or not at the time of full extension locking, and there is no danger of hands being caught or hurt when the lock is released, and also the structure is simplified.

7 Claims, 8 Drawing Figures

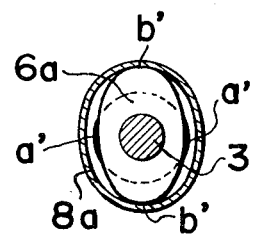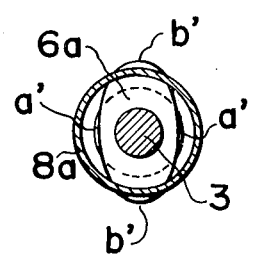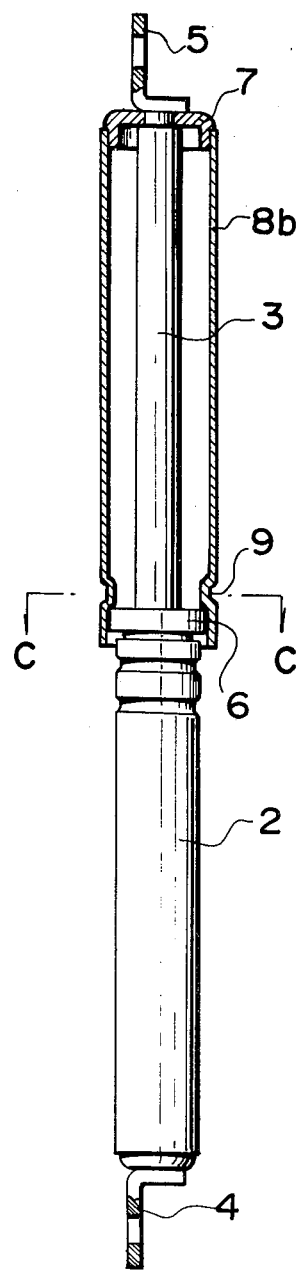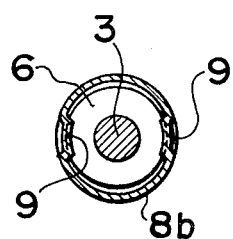

FULL EXTENSION LOCKING DEVICE FOR DAMPER

BACKGROUND OF THE INVENTION

This invention concerns a full extension locking device for a damper, especially a stay damper for closing and opening the rear hatch or trunk lid of a car, which securely maintains the fully extended state of the damper and contracts the damper when an external force is added.

Usually in a car with a rear hatch, the stay damper using a gas spring is installed between the car body and the rear hatch, and when the hatch is opened, the gas spring is extended by its gas pressure to support the weight thereof and to maintain the open state. That is, in the conventional stay damper the bearing power when the hatch is opened with the use of the repulsive power, is provided by the gas pressure only. If, however, wind pressure is applied to this hatch when the hatch is opened or if something hits the stay damper when goods are loaded or unloaded or other work is in progress at the back of the car, the gas sealing effect in the stay damper can be suddenly lost resulting in gas leakage and there is a danger of part of human body being hit by the hatch which drops with its own weight. Or if the gas is lost due to the deterioration of the seal after prolonged use, and when the hatch is opened and carelessly left, it may drop on your hand or other part of your body.

To prevent this kind of danger, several locking devices have been developed which lock the stay damper at its full extension when the rear hatch of the car is opened.

For example, there is the gas spring disclosed in the U.S. Pat. No. 3,883,126 which has a mechanical locking device that operates automatically and prevents a relative contracting movement between the piston rod and the cylinder when the gas spring approaches its fully extended position. This locking device can be manually released, but there is a danger of fingers being caught when it is released.

Another gas spring disclosed in the U.S. Pat. No. 3,938,793 has a locking mechanism consisting of a fixing element provided on the piston rod and a fixing mechanism inside the cylinder which produces resisting force together with the fixing element, but since this locking mechanism is provided inside the stay damper, it is difficult to see externally whether the lock is working or not, and if the lock is not working, there is still a danger of the rear hatch dropping.

Furthermore, the stay damper disclosed in the Japanese Pat. No. 14636/1981 has a cover, formed to surround the piston rod and fixed to the piston rod, which is automatically deformed by deforming means and blocked by the upper end of the cylinder when the stay damper is fully extended. But in this stay damper, the structure of the deforming means and the cover installing section is so complicated that its manufacture is difficult and costly.

SUMMARY OF THE INVENTION

Consequently, the objective of this invention is to provide a full extension locking device for a damper which is free from the danger of causing injury, when the lock is released.

Another objective of this invention is to provide a full extension locking device for the damper in which it is possible to see externally whether the lock is working or not.

Another objective of this invention is to provide a full extension locking device for the damper whose structure is simple.

To achieve these objectives, this invention has an elastic cover provided along the cylinder and fixed to the piston rod, the outer end or locking section of which is blocked by the outer end or stopper of the cylinder when the damper is fully extended and which is deformed to release the aforementioned blocking when the damper is contracted.

DESCRIPTION OF THE DRAWINGS

FIG. 5 shows a cross-sectional view of the stay damper, when contracted, using the locking device related to another embodiment of this invention.

FIG. 6 shows a cross-sectional view of the stay damper of FIG. 5 when it is fully extended.

FIG. 7 shows the profile of the stay damper, when fully extended, using the locking device related to another embodiment of this invention.

FIG. 8 is a view taken along line C—C of the stay damper of FIG. 7.

DESCRIPTION OF EMBODIMENT

Figure 1:
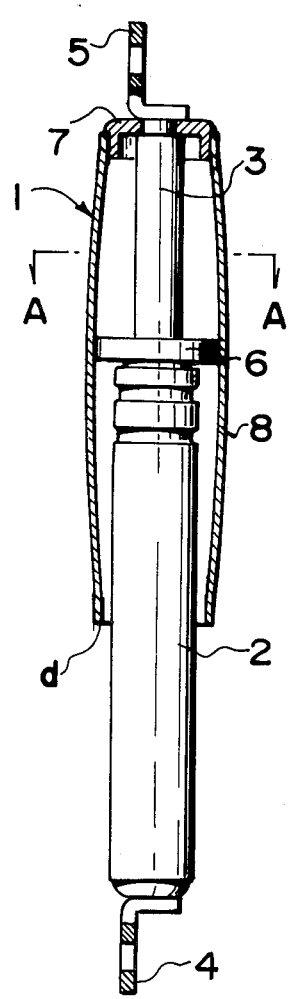
FIG. 1 shows the profile of the stay damper using the locking device related to one embodiment of this invention.

One good embodiment of this invention shall be explained using FIGS. 1-4.

The stay damper 1 has a piston rod 3 to slide freely into and out of the cylinder 2 in which, as is well known, for example, a gas compartment that is closed by means of the free piston, and the gas pressure inside the gas compartment always pushes the piston rod 3 in its extending direction.

The bottom of the cylinder 2 and the top of the piston rod 3 are attached with brackets 4 and 5, by means of which the stay damper 1 is installed between, for example, the car body and the back door, and the back door is always driven in the opening direction. At the top of the cylinder 2 there is a ring-shaped (true roundness) stopper 6 fixed.

At the top of the piston rod 3, there is an elastic cover 8 made of synthetic resin, thin metal plate, etc. provided along the outer circumference of the cylinder 2 and fixed by means of the bracket 7. The section of this cover 8 is formed oval, and the longer diameter is bigger than the outside diameter of the cylinder 2 or of the stopper 6, and the shorter diameter is smaller than the outside diameter of the cylinder 2 or of the stopper 6.

In this invention, the stopper 6 is not always required, and in such a case, the shorter diameter of the cover 8 is made smaller than the outside diameter of the cylinder 2, and in case the stopper 6 is provided, the outside diameter of the cylinder 2 is made smaller (or the same) as than the outside diameter of the stopper 6 and also the shorter diameter of the cover 8 is made smaller than the outside diameter of the stopper 6.

The cover 8 is so made that in the static state it is compressed in the mutually approaching direction of the shorter diameter sections (a) and (a) by a spring force to restore the oval or oblong shape and the inside diameter becomes smaller than the outside diameter of the cylinder 2 or of the stopper 6, and when the longer diameter sections (b) and (b) are pressed manually inwardly, the cover is expanded in a direction to form a true circle against the spring force, i.e. mutually separating direction of the shorter diameter sections (a) and (a), and the inside diameter of the shorter diameter sections (a) and (a) becomes larger than the outside diameter of the cylinder 2.

The following will explain the operation.

Figure 4:
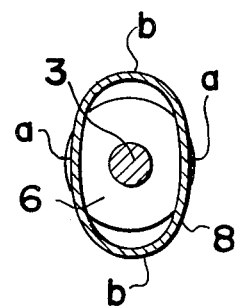
FIG. 4 is a view taken along line B—B of FIG. 3.
Figure 2:
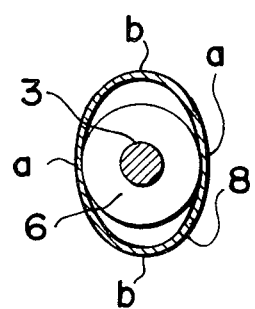
FIG. 2 is a view taken along line A—A of FIG. 1.

If the above stay damper 1 is used for opening and closing the rear hatch of a car and when the hatch is to be opened, the piston rod 3 is extended by the gas pressure inside the stay damper 1 to push up the rear hatch. At that time, the inner circumference of the shorter diameter sections (a) and (a) of the cover 8 is expanded outwardly in contact with the outer circumference of the stopper 6, and as the piston rod 3 is extended, the cover 8 moves upwardly sliding on the outer circumference of the stopper 6 (FIG. 1 and FIG. 2). When the piston rod 3 is fully extended, the hatch is fully opened, and at that time, the open bottom section (d) of the cover 8 goes up, coming out of the cylinder 2 and the stopper 6 and the shorter diameter sections (a) and (a) of the cover 8 are compressed inward by the spring force to restore the oval shape, and the inside diameter becomes smaller than the outside diameter of the stopper 6. For this reason, if the stay damper 6 is affected by an external force and the gas in the gas compartment is lost due to a sealing failure and when the hatch starts to drop with its own weight, the bottom end (d) of the cover 8 is blocked at the top of the stopper 6 as shown in FIG. 4 to prevent the piston rod 3 from lowering, thus locking the damper in full extension. Since the rapid and natural drop of the hatch is avoided, there will be no danger of things being caught or fingers or any other part of the human body being hurt.

To close the back door from the state of FIG. 4, firstly the longer diameter sections (b) and (b) of the cover 8 are pressed inward by fingers, etc., to expand the shorter diameter sections (a) and (a) of the cover 8, and the inside diameter becomes larger than the outside diameter of the stopper 6 and the contact between the stopper 6 and the bottom end of the cover 8 is released. If the hatch is pressed down from this state, the piston rod 3 goes down, the cylinder 2 and stopper 6 pass through the cover 8, the stay damper 1 contracts, and the hatch is closed.

FIG. 5 and FIG. 6 show the full extension locking devices for the damper related to other embodiments of this invention and here, the cover is made truly round and the stopper is made oval.

That is, an elastic cover 8a is provided along the outer circumferences of the piston rod 3 and cylinder 2 and fixed to the top of the piston rod 3 by means of the bracket 7, and this cover 8a made of synthetic resin, thin metal plate or other similar elastic material is formed which is truly round in section. At the top of the cylinder 2 there is an oval or oblong stopper 6a fixed which slides with the outer circumference in contact with the inner circumference of the cover 8A, and the longer diameter of the stopper 6a is made larger than the inside diameter of the cover 8a and the shorter diameter is made smaller than or almost equal to the inside diameter of the cover 8a. For this reason, in the state of FIG. 5 where the stopper 6a is located inside the cover 8a, the inner circumference of the cover 8a is pressed outward by the longer diameter sections (b') and (b') of the stopper 6a, and the section is deformed into oval shape. The stopper 6a should be curved at the longer diameter (b') and (b') sides which slide in contact with the cover 8a but the shorter diameter sections (a') and (a') should not necessarily be curved, and the shape similar to the oval in plan view is also acceptable.

The cover 8a is so made that in the static state, it is compressed in the mutually approaching direction by the spring force to restore the oval and the inside diameter becomes smaller than the outside diameter of the longer diameter sections (b') and (b') of the stopper 6a, and if the sections corresponding to the shorter diameter sections (a') and (a') of the stopper 6a are manually pressed inwardly, the sections corresponding to the longer diameter sections (b') and (b') are expanded in the mutually separating direction against the spring force, and the inside diameter becomes larger than the longer diameter sections (b') and (b') of the stopper 6a.

Figure 3:
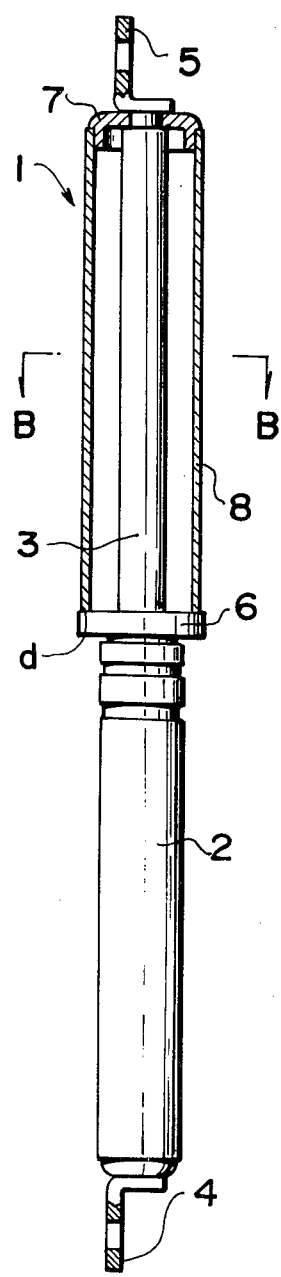
FIG. 3 shows the profile of the stay damper of FIG. 1 when it is fully extended.

When the hatch is to be opened, the piston rod 3 is extended by the gas pressure inside the stay damper 1 to push up the hatch. At that time, the inner circumference of the cover 8a is expanded outward in contact with the outer circumference of the stopper 6a and as the piston rod 3 is extended, the cover 8a moves up sliding on the outer circumference of the stopper 6a. (FIG. 5). When the piston rod 3 is fully extended, the back door is fully opened, and at that time the open end (d) of the cover 8a goes up, coming out of the cylinder 2 and the stopper 6a, same as shown in FIG. 1 and FIG. 3. At that time, the sections corresponding to the longer diameter sections (b') and (b') of the stopper 6a are compressed inward by the spring force to restore the true roundness, and the inside diameter becomes smaller than the outside diameter of the longer diameter sections (b') and (b') of the stopper 6a. (FIG. 6). For this reason, if the stay damper 1 is affected by an external force and the gas in the gas compartment is lost due to the sealing failure and when the hatch starts to drop with its own weight, the bottom part (d) is blocked at the top of the stopper 6 to prevent the piston rod 3 from lowering thus locking the full extension.

To close the hatch from the state of FIG. 6, firstly the sections of the cover 8a corresponding to the shorter diameter sections (a') and (a') of the stopper 6a are pressed inwardly by fingers, etc., and then the sections corresponding to the longer sections (b') and (b') of the stopper 6a are expanded outwardly against the spring force, the inside diameter becomes larger than the outside diameter of the longer diameter sections (b') and (b') of the stopper 6a, and the blocking of the bottom (d) of the cover 8a is released. If the hatch is pressed from this position, the piston rod 3 goes down, the cylinder 2 passes through the cover 8a, the stay damper 1 contracts and the hatch is closed.

FIG. 7 and FIG. 8 show other embodiment of this invention where the cover side is provided with the sections to block the cylinder. The structure other than the blocking section is the same as that in FIG. 1.

That is, an elastic tubular cover 8b made of synthetic resin, thin metal plate, etc., with the inside diameter larger than the outside diameter of the cylinder 2 of the stopper 6, is fixed to the top of the piston rod 3 by means of the bracket 7. This cover 8b has lower open end through which the cylinder 2 and the stopper 6 can be moved.

The lower part of the cover 8b has blocking sections 9 and 9 projected inward at the corresponding positions displaced 180 degree, and the distance between these blocking sections 9 and 9 is made smaller than the outside diameter of the stopper 6 and the cylinder 2. The number of the blocking section 9 may be one or multiple. FIG. 7 shows the stopper 6 provided on the cylinder 2, and in such a case, the diameter of the cylinder 2 is preferably smaller than the outside diameter of the stopper 6 so that the outer circumference is not damaged by the blocking section 9. The stopper 6 is not always required. If the stopper is not used, the blocking section 9 is formed by the projection of a part of the cover 8b but other projecting member can be attached to the inside of the cover 8b. Also the position of the blocking section 9 may be optional, for instance, it may be provided at the bottom port of the cover 8b and the inside diameter of the bottom end can be made smaller than the diameter of the stopper 6.

The cover 8b is truly round or oval in the static state, and is compressed in the mutually approaching direction of the inner circumference by the spring force to restore the state of true roundness or oval, and the inside diameter between the blocking sections 9 and 9 becomes smaller and the outside diameter of the cylinder 2 or of the stopper 6, and when the sections other than the blocking sections 9 and 9 are manually pressed inward, the blocking sections 9 and 9 are mutually separated and the inside diameter become larger than the outside diameter of the cylinder 2 or of the stopper 6.

When the hatch is to be opened, the piston rod 3 is extended by the gas pressure inside the stay damper 1 to push up the hatch. At that time, the blocking sections 9 and 9 of the cover 8b are in static state and the inner circumference is on the outer circumference of the cylinder, and as the piston rod 3 is extended, the cover 8b moves up along the outer circumference of the cylinder 2. When the piston rod is fully extended, the hatch is fully opened, and at that time, the blocking sections 9 and 9 of the cover 8b go up coming out of the cylinder 2 and the stopper 6 against the spring force. The blocking sections 9 and 9 once released, are compressed and the inside diameter becomes smaller than the outside diameter of the stopper 6 and the blocking sections 9 and 9 are stopped at the upper surface of the stopper 6. (FIG. 7).

To close the hatch, firstly the corresponding outer shell parts other than the blocking sections 9 and 9 of the cover 8b are pressed inwardly, the blocking sections 9 and 9 are moved outwardly (mutually separated), the inside diameter becomes larger than the outside diameter of the cylinder 2 and the contact between the blocking sections and the stopper 6 is released. If the hatch is pressed from this state, the piston rod 3 goes down, the cylinder 2 passes through the cover 8, the stay damper 1 contracts and the hatch is closed.

According to this invention, the locking device including the stopper 6 is provided at the upper end of the cylinder 2, and therefore, the locking device including the stopper 6 can clearly be seen externally and the danger due to the lock removal can be avoided.

Also, when the covers (8, 8a and 8b) are pressed with the fingers, the hands will never be caught between the covers 8, 8a and 8b and the piston rod 3 or the cylinder 2 and injury can be avoided.

Good workability because only the covers 8, 8a and 8b can be pressed to release the locking, and the simple structure makes the manufacture easy and economical, and when it is broken, it can be easily replaced.

What is claimed is:

1. A damper comprising:

a cylinder defining a space and having a longitudinal axis;

a piston rod slidable in said space and lying on said longitudinal axis;

pressure means in said space for urging said piston rod into an extended position with respect to said cylinder, said piston rod having an end remote from said cylinder and a length between said end and said cylinder;

a sleeve shaped elastic cover connected to said piston rod end and extending over said piston rod; and a stopper connected to said cylinder at an end of said cylinder into which said piston rod is slidable, said elastic cover having a length from said piston rod end to said cylinder which is about equal to the length of said piston rod between said end of said piston rod and said cylinder when said piston rod is in its extended position, said elastic cover sliding over said cylinder when said piston rod is out of its extended position;

one of said stopper and said elastic cover having a cross section transverse to said longitudinal axis which is elongated and has a large diameter and a small diameter, with a pair of large diameter sections and a pair of small diameter sections, the other of said stopper and elastic cover having a medium diameter between said large diameter and said small diameter so that, with said piston rod in its extended position, said elastic cover is engaged on said stopper to retain said piston rod in its extended position, and for moving said piston rod out of its extended position, said elastic cover is deformable to reduce the distance between said large diameter sections and increase the distance between said small diameter sections to permit said elastic cover to pass said stopper.

2. A damper according to claim 1, wherein said elastic cover is oval in shape and has a cross section with said large diameter and said small diameter, said stopper being circular with said medium diameter.

3. A damper according to claim 2, wherein said cylinder has a diameter which is less than said medium diameter of said stopper.

4. A damper according to claim 1, wherein said stopper is oval with said large diameter and said small diameter, said elastic cover being circular and having said medium diameter.

5. A damper according to claim 4, wherein said small diameter of said stopper is less than a diameter of said cylinder and said large diameter of said stopper is greater than the diameter of said cylinder.

6. A damper according to claim 1, wherein said elastic cover has said cross section with said large diameter and said small diameter, said small diameter sections being formed by a pair of opposite blocking sections, said stopper having a pair of blocking section receiving recesses for receiving said blocking sections with said piston rod in its extended position, said elastic cover being deformable by moving said large diameter sections thereof together to withdraw said blocking sections thereof from said blocking section receiving recesses of said stopper to permit movement of said piston rod away from its extended position, said length of said elastic cover being between said piston rod end and said blocking sections.

7. A damper according to claim 6, wherein said blocking sections are disposed at an end of said elastic cover remote from said piston rod end.

* * * * *